US008819666B2

(12) United States Patent
Powell et al.

(10) Patent No.: US 8,819,666 B2
(45) Date of Patent: *Aug. 26, 2014

(54) SYSTEMS AND METHODS FOR UPDATING A SOFTWARE PRODUCT

(71) Applicant: Symantec Corporation, Mountain View, CA (US)

(72) Inventors: Brian Powell, El Segundo, CA (US); Petrus Johannes Viljoen, Redondo Beach, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/036,223

(22) Filed: Sep. 25, 2013

(65) Prior Publication Data

US 2014/0026129 A1    Jan. 23, 2014

Related U.S. Application Data

(63) Continuation of application No. 12/538,622, filed on Aug. 10, 2009, now Pat. No. 8,589,904.

(51) Int. Cl.
*G06F 9/44* (2006.01)
*G06F 9/445* (2006.01)
*G06F 9/00* (2006.01)

(52) U.S. Cl.
CPC ... *G06F 8/65* (2013.01); *G06F 8/67* (2013.01)
USPC .......... 717/170; 717/168; 717/169; 717/171; 717/172; 717/173; 717/174; 717/122; 713/2

(58) Field of Classification Search
CPC .................................. G06F 8/65; G06F 8/67
See application file for complete search history.

(56) References Cited

U.S. PATENT DOCUMENTS

| 5,555,418 | A  | * | 9/1996  | Nilsson et al. ............... 717/153 |
| 5,845,077 | A  | * | 12/1998 | Fawcett ....................... 709/221 |
| 5,922,072 | A  | * | 7/1999  | Hutchinson et al. ............ 713/2 |
| 6,698,017 | B1 | * | 2/2004  | Adamovits et al. .......... 717/168 |
| 6,738,826 | B1 | * | 5/2004  | Moberg et al. ............... 709/242 |
| 7,107,329 | B1 | * | 9/2006  | Schroder et al. ............. 709/221 |
| 7,246,349 | B2 | * | 7/2007  | Moerdijk et al. ............. 717/170 |
| 7,698,700 | B2 | * | 4/2010  | Armstrong et al. .......... 717/169 |
| 7,823,145 | B1 | * | 10/2010 | Le et al. ....................... 717/168 |
| RE42,685  | E  | * | 9/2011  | Oesterreicher et al. ....... 717/171 |
| 8,146,072 | B2 | * | 3/2012  | Trueba ......................... 717/170 |
| 8,146,073 | B2 | * | 3/2012  | Sinha ........................... 717/170 |
| 8,255,362 | B2 | * | 8/2012  | Johnson et al. .............. 707/625 |
| 2003/0182411 | A1 | * | 9/2003 | Wang et al. ................... 709/223 |
| 2005/0022179 | A1 | * | 1/2005 | Denissen ...................... 717/171 |

(Continued)

FOREIGN PATENT DOCUMENTS

| EP | 1096445 | 5/2001 |
| WO | WO-01/01252 | 1/2001 |

*Primary Examiner* — Henry Tsai
*Assistant Examiner* — Jing-Yih Shyu
(74) *Attorney, Agent, or Firm* — ALG Intellectual Property, LLC

(57) ABSTRACT

A method may include receiving a request to install a second version of a software product over a first version of the software product, installing the second version of the software product in a dormant state while the first version of the software product is running, and swapping the first and second versions of the software product by activating the second version of the software product and deactivating the first version of the software product. Various other methods, systems, and computer-readable media are also disclosed.

19 Claims, 6 Drawing Sheets

(56) References Cited

U.S. PATENT DOCUMENTS

| | | | |
|---|---|---|---|
| 2005/0160418 A1* | 7/2005 | Jeong et al. | 717/173 |
| 2005/0257211 A1* | 11/2005 | Chatterjee et al. | 717/170 |
| 2007/0006214 A1* | 1/2007 | Dubal et al. | 717/171 |
| 2008/0244552 A1* | 10/2008 | Toeroe | 717/168 |
| 2009/0089774 A1* | 4/2009 | Lynch et al. | 717/173 |
| 2009/0183233 A1* | 7/2009 | Trueba | 726/3 |
| 2009/0187900 A1* | 7/2009 | Nakamoto | 717/168 |
| 2010/0131939 A1* | 5/2010 | Hieb et al. | 717/169 |

* cited by examiner

SYSTEMS AND METHODS FOR UPDATING A SOFTWARE PRODUCT

CROSS REFERENCE TO RELATED APPLICATION

This application is a continuation of U.S. application Ser. No. 12/538,622, filed Aug. 10, 2009, the disclosure of which is incorporated, in its entirety, by this reference.

BACKGROUND

Enterprises and individuals periodically upgrade or replace security software products that protect their computing systems. Various conventional technologies may be used to upgrade and replace security software products. Unfortunately, conventional technologies for upgrading and replacing security software products, such as MICROSOFT INSTALLER ("MSI") and MICROSOFT PATCH ("MSP") technologies, may leave a computer system vulnerable during a time period when no security product is running.

MSI replacements of security products often involve uninstalling an existing security product, rebooting a computing system on which the security product was installed, and installing a new security product. The computing system may be unprotected from the time the old security product was uninstalled until the time the new security product is installed and activated.

MSP upgrades of security products may transform a first version of a security product to a second version of a security product. During the upgrade, running processes of the security product may be stopped, updated, and then restarted. Thus, the system protected by the security product may be vulnerable while the security product is being updated. What is needed, therefore, is a more effective way to replace and/or update software products.

SUMMARY

As will be described in greater detail below, the instant disclosure generally relates to systems and methods for updating a software product. As used herein, the phrase "updating a software product" generally refers to upgrading and/or replacing an existing software product. In some embodiments, a method may include receiving a request to install a second version of a software product over a first version of the software product, installing the second version of the software product in a dormant state while the first version of the software product is running, and swapping the first and second versions of the software product by activating the second version of the software product and deactivating the first version of the software product. The software product may include a security software product. For example, the first version of the software product may include a first version of an antivirus application and the second version of the software product may include a second version of the antivirus application.

In certain embodiments, the method may include rebooting a computing system on which the first and second versions of the software product are installed. The rebooting may be performed after installing the second version of the software product and before activating the second version of the software product. According to various embodiments, the second version of the software product may be activated during the rebooting process before a network adapter of the computing system is enabled. The method may include disabling the network adapter until the second version of the software product is enabled.

According to various embodiments, installing the second version of the software product may include installing one or more files of the second version of the software product and installing one or more components of the second version of the software product needed during a boot process. In some embodiments, installing the second version of the software product may include partially installing the second version of the software product by installing one or more components of the second version of the software product that do not affect execution of the first version of the software product and refraining from installing one or more components of the second version of the software product that would affect execution of the first version of the software product if installed.

In one or more embodiments, deactivating the second version of the software product may include modifying a state of one or more components of the first version of the software product such that the one or more components will not restart after a reboot. According to various embodiments, installing the second version of the software product may include saving one or more settings of the first version of the software product and swapping the first and second versions of the software product may include importing the one or more settings of the first version of the software product into the second version of the software product.

According to certain embodiments, installing the second version of the software product may include identifying a set of differences between the first version of the software product and the second version of the software product and swapping the first and second versions of the software product may include using the set of differences to update one or more components of the first version of the software product for use with the second version of the software product. In various embodiments, swapping the first and second versions of the software product may include uninstalling the first version of the software product after the first version of the software product is deactivated and the second version of the software product is activated. In at least one embodiment, the method may be tangibly embodied as computer-executable instructions on at least one computer-readable-storage medium.

In certain embodiments, a method may include receiving a request to install a second version of the security software product over a first version of the security software product. The method may also include installing the second version of the security software product in a dormant state while the first version of the security software product is running by installing one or more components of the second version of the security software product that do not affect execution of the first version of the security software product and refraining from installing one or more components of the second version of the security software product that would affect execution of the first version of the security software product if installed.

The method may further include rebooting a computing system on which the first and second versions of the security software product are installed and swapping the first and second versions of the security software product by activating the second version of the security software product and deactivating the first version of the security software product. According to some embodiments, the method may include installing one or more files of the second version of the security software product and installing one or more components of the second version of the security software product needed during a boot process. The method may additionally or alternatively include modifying a state of one or more components of the first version of the software product such that the one or more components will not restart after rebooting the computing system.

In certain embodiments, a system may include at least one processor, an interface module programmed to direct to the processor to receive a request to install a second version of a software product over a first version of the software product, an installation module programmed to direct the processor to install the second version of the software product in a dormant state while the first version of the software product is running, and a swapping module programmed to direct the processor to swap the first and second versions of the software product by activating the second version of the software product and deactivating the first version of the software product.

In some embodiments, the first version of the software product may include a first version of an antivirus application and the second version of the software product may include a second version of the antivirus application. According to various embodiments, the swapping module may be programmed to direct the processor to deactivate the second version of the software product by modifying a state of one or more components of the first version of the software product such that the one or more components will not restart after a reboot. In at least one embodiment, the installation module may be programmed to direct the processor to install the second version of the software product by installing one or more files of the second version of the software product and/or installing one or more components of the second version of the software product needed during a boot process.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
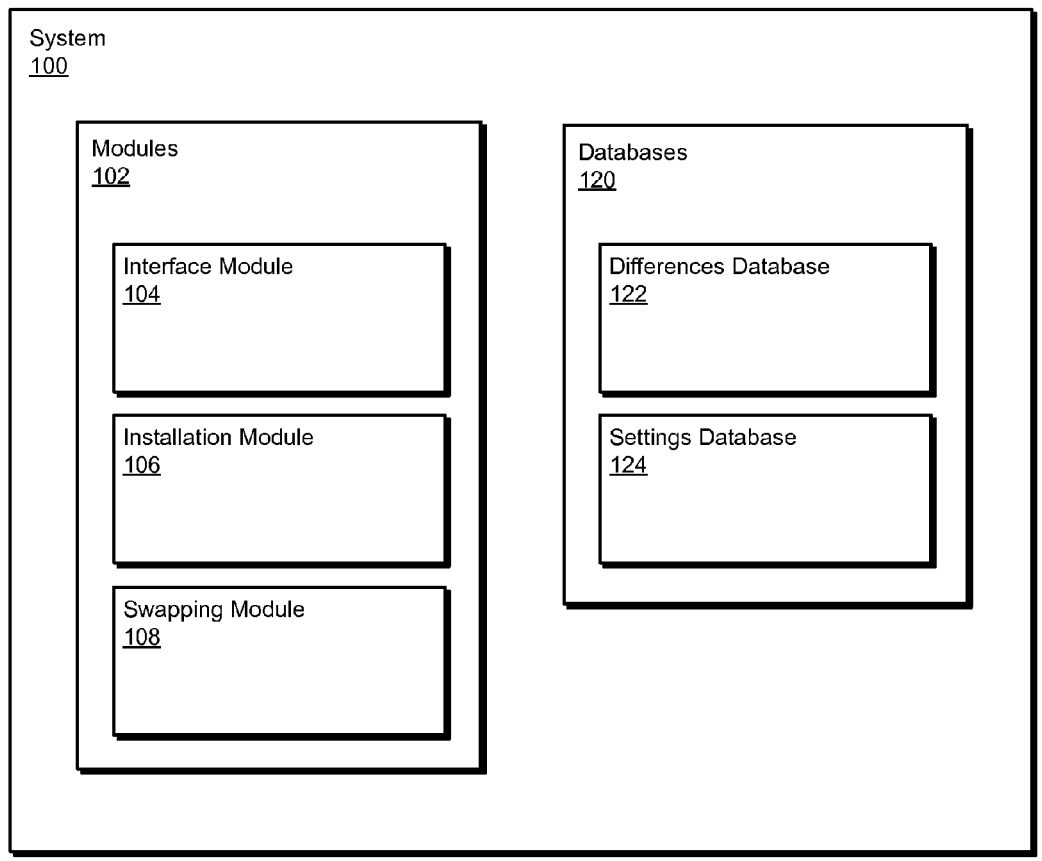
FIG. 1 is a block diagram of an exemplary system for updating a software product.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for updating a software product. Embodiments of the instant disclosure may over-install a new product without uninstalling an existing product during the installation process. For example, a computing system may install a second version of a software product in a dormant state while a first version of the software product is running and may swap the first and second versions of the software product by activating the second version of the software product and deactivating the first version of the software product.

Embodiments of the instant disclosure generally apply to situations where a software product is being installed over another software product (i.e., situations where only one version of a product can run at a time). In such situations, conventional installation tools typically uninstall the existing software product before installing the new software product, which may result in a period of time when neither software product is running. For security software products, such as antivirus and data protection products, a computing system protected by an existing product may be vulnerable while the existing product is uninstalled and a new product is installed. Embodiments of the instant disclosure may eliminate and/or minimize down time of a software product by installing a new version of the software product while an existing version of the software product is still running. Embodiments of the instant disclosure also provide various other features and advantages.

Figure 2:
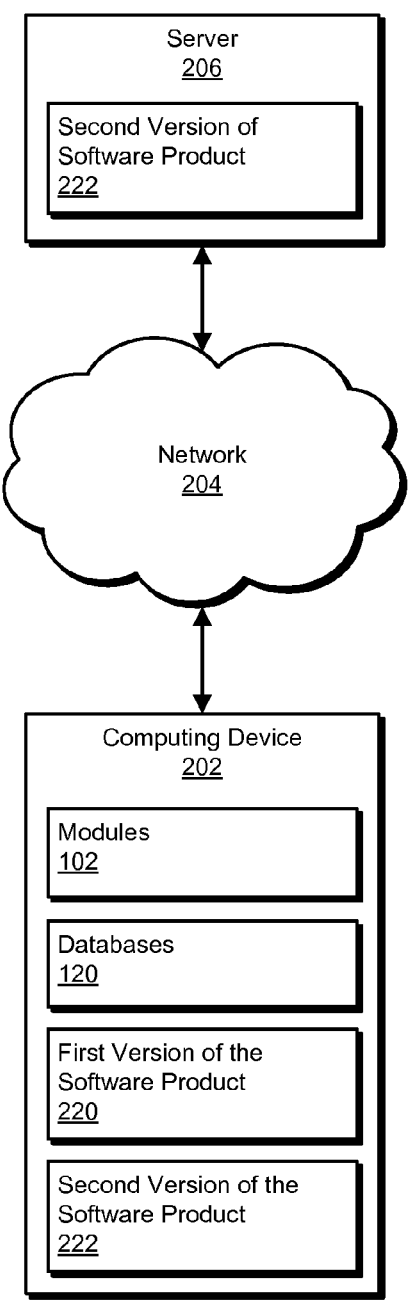
FIG. 2 is a block diagram of another exemplary system for updating a software product.

The following will provide, with reference to FIGS. 1-2, detailed descriptions of exemplary systems for updating a software product. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for updating a software product. As illustrated in this figure, exemplary system 100 may include one or more modules 102 for performing one or more tasks. For example, and as will be explained in greater detail below, exemplary system 100 may include an interface module 104 programmed to receive a request to install a second version of a software product over a first version of the software product. Exemplary system 100 may also include an installation module 106 programmed to install the second version of the software product in a dormant state while the first version of the software product is running.

In addition, and as will be described in greater detail below, exemplary system 100 may include a swapping module 108 programmed to swap the first and second versions of the software product by deactivating the first version of the software product and activating the second version of the software product. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a differences database 122 for storing differences between a first version of a software product and a second version of the software product. Exemplary system 100 may also include a settings database 124 for storing one or more settings to be migrated from a first version of a software product to a second version of the software product.

Databases 120 in FIG. 1 may represent a portion of one or more computing devices. For example, databases 120 may represent a portion of server 206 in FIG. 2, computing system 510 in FIG. 5, and/or portions of exemplary network architecture 600 in FIG. 6. Alternatively, databases 120 in FIG. 1 may represent one or more physically separate devices capable of being accessed by a computing device, such as server 206 in FIG. 2 computing system 510 in FIG. 5 and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing device 202 in communication with a server 206 via a network 204. In one embodiment, computing device 202 may include one or more of modules 102 and/or one or more of databases 120. Computing device 202 may also include a first version of a software product 220 and a second version of the software product 222. Computing device 202 may execute one or more of modules 102 and may use one or more of databases 120 in a process for writing second version of the software product 222 over first version of the software product 220. In some embodiments, computing device 202 may receive second version of software product 222 from server 206 as part of an enterprise software deployment. Alternatively, second version of the software product 222 may be written over first version of the software product 220 as part of an installation initiated directly on computing device 202. For example, second version of the software product 222 may be provided by any suitable delivery mechanism, including a CD, a DVD, a BLUERAY disk, a USB device, the Internet, and/or a local network.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of deploying a software product. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
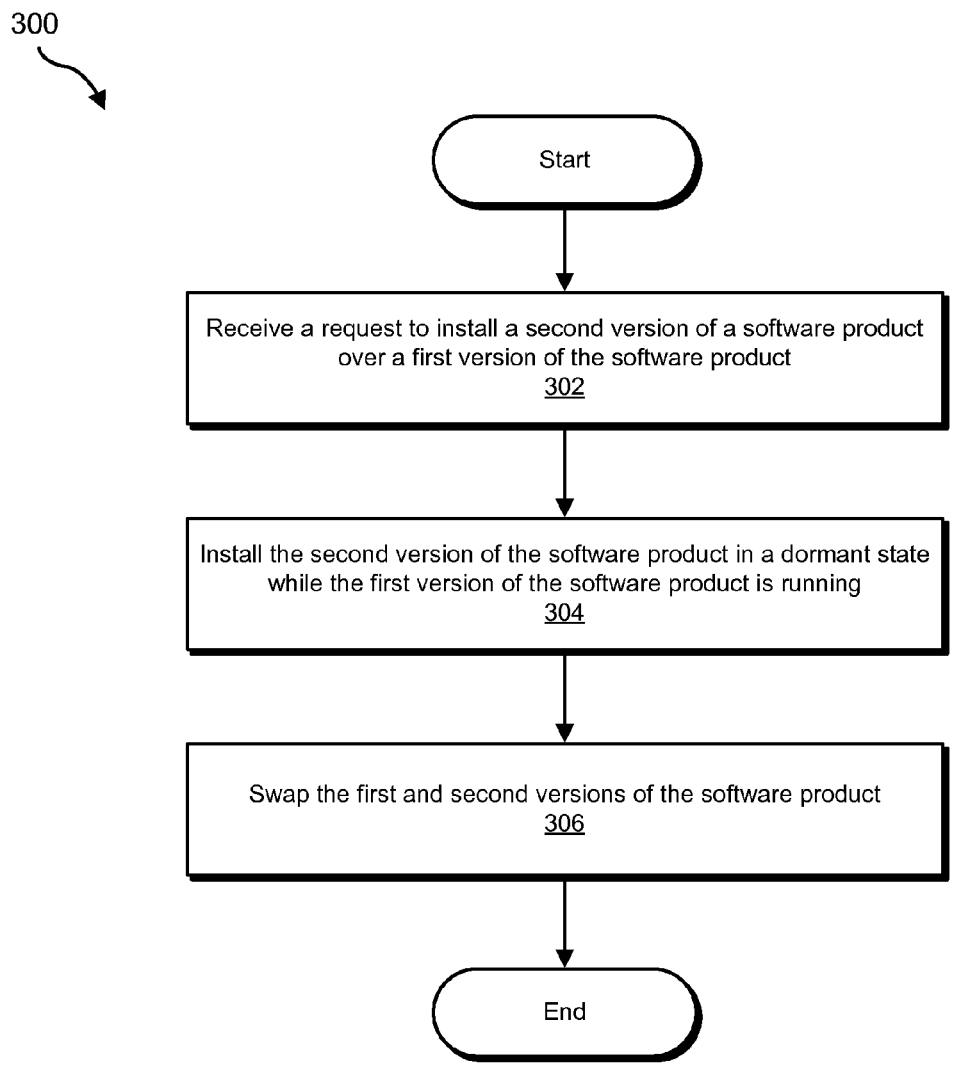
FIG. 3 is a flow diagram of an exemplary method for updating a software product.

FIG. 3 a flow diagram of an exemplary computer-implemented method 300 for updating a security software product. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 302 interface module 104 may, as part of computing device 202, receive a request to install a second version of a software product over a first version of the software product. In some embodiments, the request may be received from a remote application. For example, a server deploying the second version of the software product may request installation of the software product. The request may also be a request from an installation package that contains the second version of the software product. Additionally or alternatively, the request may be received from an Information Technology ("IT") administrator or other user.

As used herein, the phrase "software product" refers to any software application, executable file, installation package, or other computer-executable code programmed to be installed and executed on a computing system. Software products include, without limitation, word processors, spreadsheets, productivity software, security software (antivirus programs, firewalls, parental-control software, data-loss-prevention software, etc.), and various other types of software programs. The phrases "first version of a software product" and "second version of a software product" may refer to older and newer versions, respectively, of the same software program from the same company. For example, the first version of a software product may be a 2008 version of an anti-virus program and the second version of the software product may be a 2009 version of the same program.

Alternatively, the first and second versions of a software product may be different programs that perform similar functionality. For example, the first version of a software program may be a firewall application developed by a first software company and the second version of the software program may be a firewall application developed by a second software company. In other embodiments, the first and second versions of a software program may be different, but related, programs from the same company. For example, the first version of the software product may be a basic computer security program with basic functionality (e.g., an antivirus program) and the second version of the software product may be an advanced computer security program with more advanced functionality (e.g., an internet security suite of programs).

As used herein, the phrase "install a second version of a software product over a first version of the software product" generally refers to over-installing one version of a software product over another version of the software product. An over-install generally refers to an installation process for installing one version of a software application and removing a previous version of the software application. In contrast, other installation processes may not involve replacing one version of a product with another version of the product. Such installation processes include installing a patch to an existing software product and installing two versions of a software product side-by-side. Over-install does not refer to these patch installations and side-by-side installations.

Over-installation processes may be used in situations where only a single instance of a software product may run at a time. For example, many computing systems may only allow one firewall software program to run at a time. Other single-instance install situations include situations where installation of two similar software products may result in conflicts and/or other issues that may result in system instability.

Returning to FIG. 3, at step 304 installation module 106 may, as part of computing device 202, install the second version of the software product in a dormant state while the first version of the software product is running. Installation module 106 may install the second version in a variety of manners, as described in greater detail below. As used herein, the phrase "dormant state" refers to a software product that is at least partially installed but is not executing. Installation module 106 may install the second version of the software product in a dormant state by installing the second version of the software product in a manner that does not interfere with the first version of the software product as the first version of the software product is running.

In some embodiments, installation module 106 may install the second version of the software product by installing one or more files of the second version of the software product. For example, installation module 106 may install one or more executable files and/or other code of the second version of the software product. Installation module 106 may also install one or more other components of the second version of the software product. For example, installation module 106 may install one or more services, drivers, registry keys, and/or other components of the second version of the software product.

Installation module 106 may partially install the second version of the software product by only installing files and other components of the second version of the software product that do not affect execution of the first version of the software product and by refraining from installing one or more components of the second version of the software product that may affect execution of the first version of the software product if installed. Installation module 106 may identify components of the second version of the software product that do not affect execution of the first version of the software product in a variety of ways. In some embodiments, installation module 106 may identify such components by reading a list or other database that identifies components that are safe to install while the first version of the software product is running.

In other embodiments, installation module 106 may automatically identify one or more components of the second version of the software product that are safe to install by determining whether the first version of the software product is utilizing components that correspond to the new components. For example, installation module 106 may refrain from overwriting a driver that is currently being used by the first version of the software product.

According to certain embodiments, installation module 106 may identify a set of differences between the first and second versions of the software product. The set of differences may be a list, a differential file, an instruction set, and/or any other set of information that identifies one or more differences between the first and second versions of the software product. The set of differences may identify one or more registry keys, one or more services, one or more shortcuts, and/or one or more actions that need to be performed at a later point in time (e.g., after a reboot) to swap the first and second versions of the software product. The set of differences may additionally or alternatively identify one or more registry keys, one or more services, one or more shortcuts, and/or one or more actions that may be performed while the first version of the software product is running (i.e., actions that will not affect execution of the first version of the software product, as previously discussed).

Installation module 106 may save one or more settings of the first version of the software product. For example installation module 106 may read one or more settings of the first version of the software product and save the settings in a database, such as settings database 124. Swapping module 108 may then read the settings from the database and import the settings into the second version of the software product. Thus, one or more settings of the first version of the software product, such as user-defined settings and/or other settings, may be preserved in the second version of the software product.

After the install is complete (or before or during the install), installation module 106 may register a service that will swap the first and second versions of the software product. The registered service, which may include swapping module 108, may be an executive mode process (i.e., a chkdsk process), a kernel driver, a system service, and/or any other suitable service.

At step 306, swapping module 108 may, as part of computing device 202, swap the first and second versions of the software product. Swapping module 108 may swap the first and second versions of the software product in a variety of manners. For example, swapping module 108 may swap the first and second versions of the software product by activating the second version of the software product and deactivating the first version of the software product. As used herein, the phrase "activating the second version of the software product" generally refers to any procedure that causes one or more processes of the second version of the software product to run and/or prepares one or more processes of the second version of the software product to run. Conversely, the phrase "deactivating the first version of the software product" generally refers to any procedure that causes one or more processes of first version of the software product to stop executing, prepares the first version of the software product to terminate execution, and/or modifies the first version of the software product such that the first version of the software product will not restart after being terminated.

In some embodiments, swapping module 108 may, while the first version of the software product is running, modify a state of one or more components of the first version of the software product such that the one or more components will not restart after a reboot. For example, swapping module 108 may change the state of one or more services and/or drivers in the first version of the software product such that they do not run after a system reboot.

Swapping module 108 may use a previously identified set of differences between the first and second versions of the software product to update one or more components of the first version of the software product for use with the second version of the software product. For example, swapping module 108 may update one or more registry keys of the second version of the software product (e.g., by adding new keys, deleting old keys and/or modifying existing keys). Additionally or alternatively, swapping module 108 may update (e.g., add, delete, and/or modify) some or all services and/or drivers of the second version of the software product. Swapping module 108 may also update one or more shortcuts, including symbolic links, of the second version of the software product. Swapping module 108 may further run one or more custom actions, such as custom executables that may modify the computing system outside of the install process.

According to certain embodiments, swapping module 108 may uninstall and/or otherwise cleanup the first version of the software product after the first version of the software product is deactivated and the second version of the software product is activated. For example, swapping module 108 may remove any files and other data associated with the first version of the software product.

Figure 4:
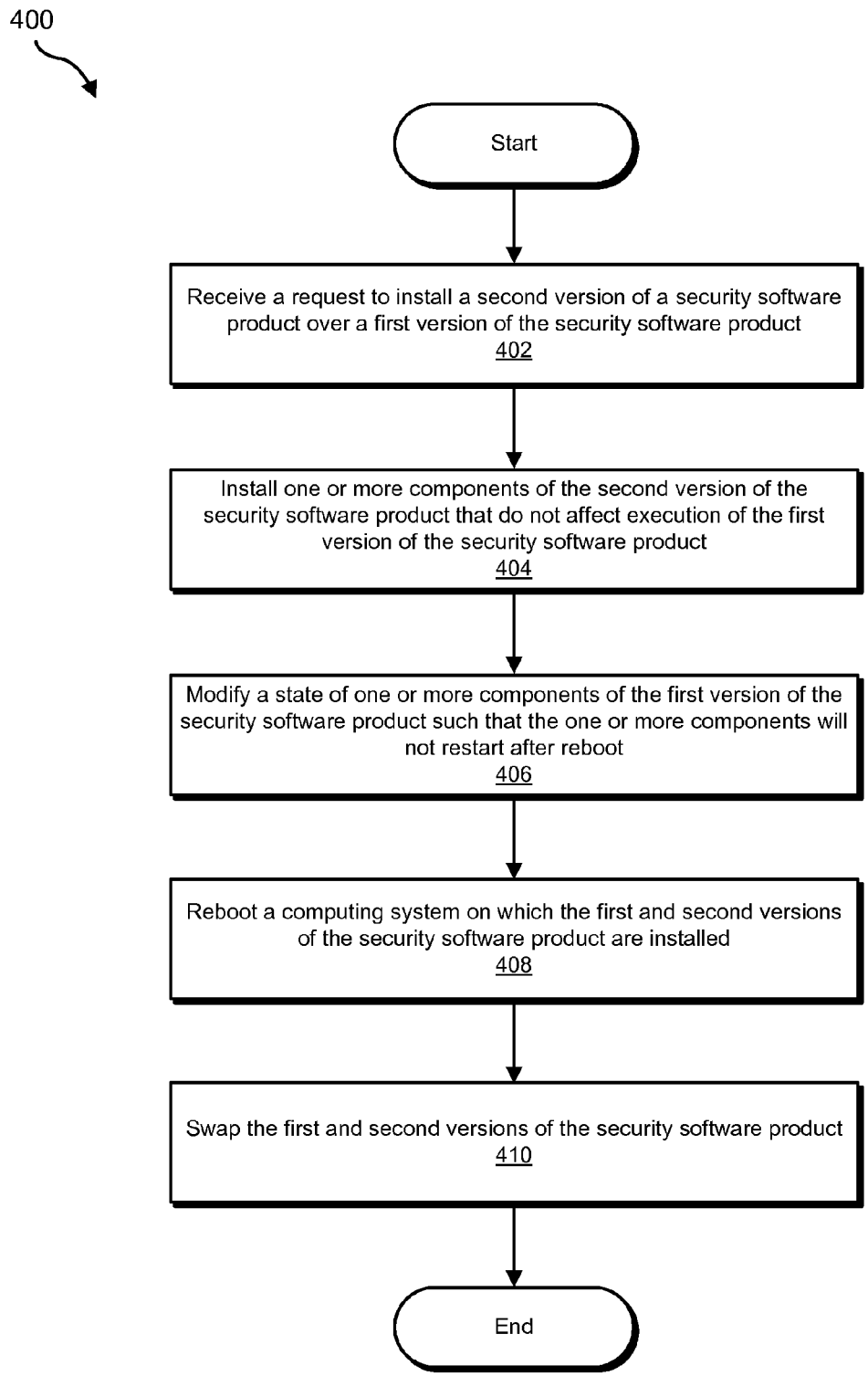
FIG. 4 is another flow diagram of another exemplary method for updating a software product.

FIG. 4 is a flow diagram of another exemplary computer-implemented method for updating a security software product, such as an antivirus application, a firewall application, a data-loss-prevention application, and/or any other application for protecting a computing system and/or data stored on a computing system. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2. For example, at step 402 interface module 104 may, as part of computing device 202, receiving a request to install a second version of a security software product over a first version of the security software product. At step 404, installation module 106 may install one or more components of the second version of the security software product that do not affect execution of the first version of the security software product. Steps 402 and 404 are similar to steps 302 and 304 and may be performed in one or more of the manners described in FIG. 3.

At step 406, installation module 106 may modify a state of one or more components of the first version of the software product such that the one or more components will not restart after reboot. For example, installation module 106 may modify one or more services and/or drivers of the first version of the software product such that they do not run after a system reboot. Such a process may be particularly useful for services and/or drivers that cannot be unloaded and/or stopped. Alternatively, services and drivers may not need to be modified before a reboot if an executive mode process is used to update services and/or drivers before they are allowed to start after reboot.

At step 408, installation module 106 may cause a computing system protected by the first version of the software product to reboot. In some embodiments, the rebooting may be performed after installing the second version of the software product and before activating the second version of the software product. In some embodiments, to protect the computing system from security threats, the second version of the software product may be activated during the rebooting process before one or more network adapters of the computing system are enabled. For example, swapping module 108 may cause the second version of the software product to be activated early in a boot process (i.e., before network adapters are activated). Alternatively, swapping module 108 may disable one or more network adapters of the computing system until the second version of the software product is enabled. Swapping module 108 may also perform any other suitable action to protect the computing system while the first and second versions of the software product are being swapped.

In some embodiments, the first version of the software product may not be disabled immediately after a reboot. For example, security drivers from the first version of the software product may run after a first reboot (e.g., such as antivirus and/or firewall drivers). During the first reboot, an executive mode application may run, which may update one or more components of the first version of the software product to the second version of the software product. For example, the executive mode application may be re-pointed without affecting their current instance. The operating system of the computing system may not be fully functional (i.e., fully loaded after the first reboot). The software product may not be fully loaded after the reboot either. After the components of the first version of the software product are updated, the first version of the software product may be set to be disabled and the second version of the software product may be enable a set to run after a second reboot. The executive mode application may force a second reboot at this point. In such situations, the first version of the software product may continue to run until after the second reboot.

At step 410, swapping module 108 may swap the first and second versions of the security software product. Step 410 is comparable to step 306 in FIG. 3. Thus, one or more of the processes disclosed in the discussion of step 306 may also be used to perform step 410.

Embodiments of the instant disclosure may enable installation of a new version of a security product over an existing version of the security product in a manner that does not expose a computing system to vulnerabilities. For example, installation processes described herein may be performed such that there is no down time between deactivating a first security software application and activating a second security software application.

Figure 5:
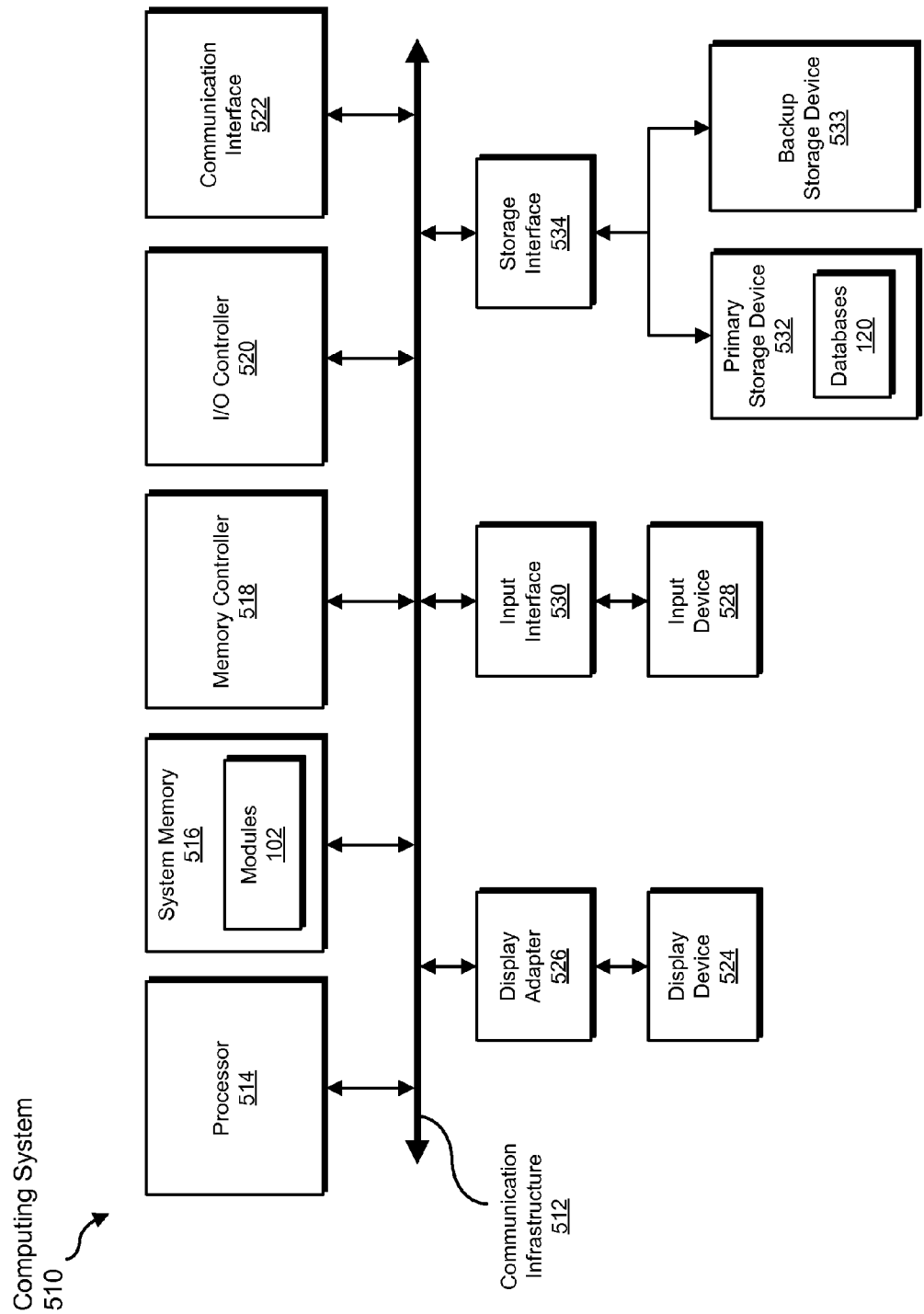
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the receiving, installing, swapping, rebooting, disabling, refraining, modifying, and/or uninstalling steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as receiving, installing, swapping, rebooting, disabling, refraining, modifying, and/or uninstalling.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the receiving, installing, swapping, rebooting, disabling, refraining, modifying, and/or uninstalling steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the receiving, installing, swapping, rebooting, disabling, refraining, modifying, and/or uninstalling steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the receiving, installing, swapping, rebooting, disabling, refraining, modifying, and/or uninstalling steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, databases 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the receiving, installing, swapping, rebooting, disabling, refraining, modifying, and/or uninstalling steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
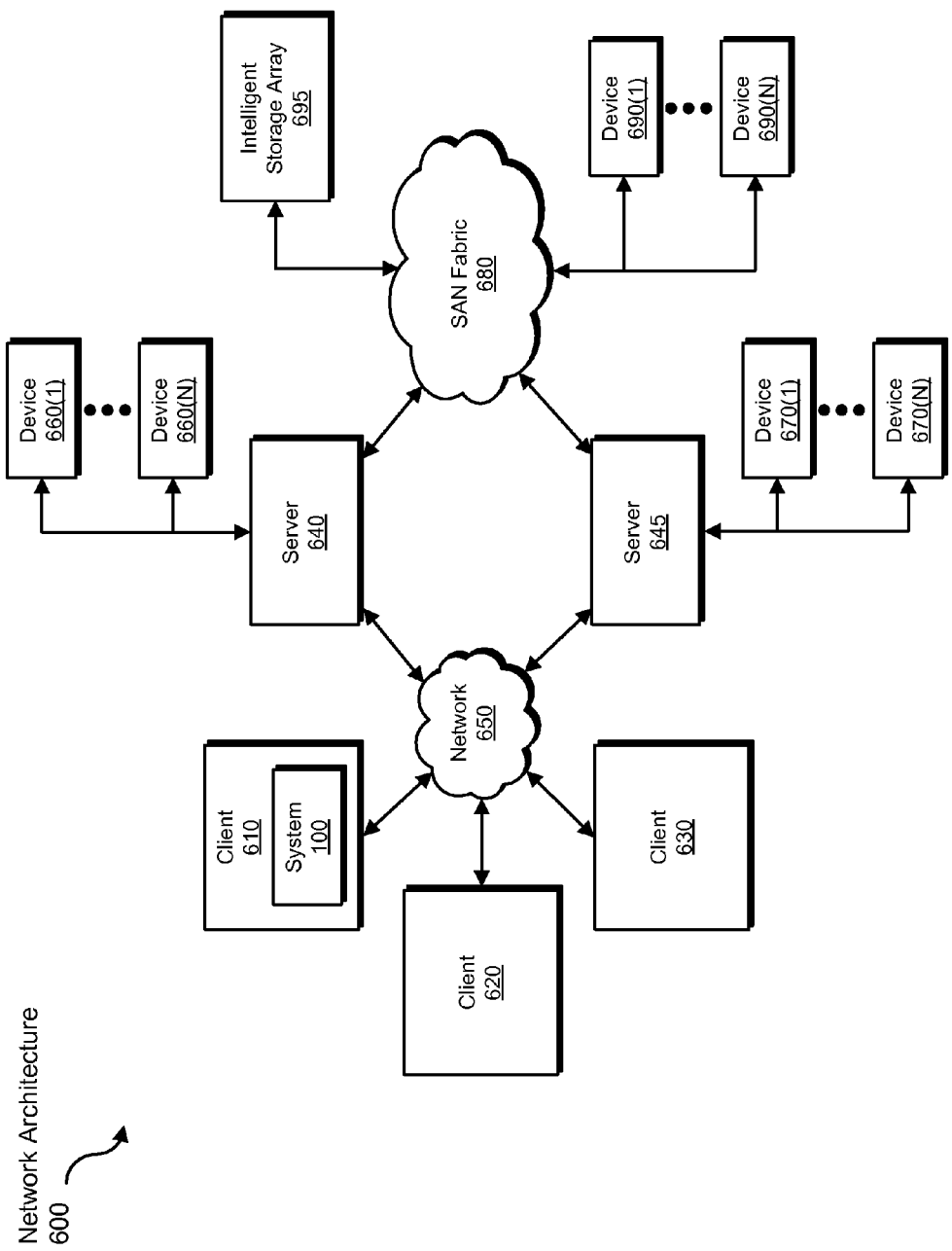
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the receiving, installing, swapping, rebooting, disabling, refraining, modifying, and/or uninstalling steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for updating a software product.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of module 102 may transform a first version of a software product into a second version of the software product.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for updating a security software product, at least a portion of the method being performed by a computing device comprising at least one processor, the method comprising:
receiving a request to install a second version of the security software product over a first version of the security software product;
performing a partial install of the second version of the security software product in a dormant state over the first version of the security software product while the first version of the security software product is running by:
automatically identifying one or more components of the second version of the security software product that do not affect execution of the first version of the security software product by determining that the first version of the security software product is not utilizing components that correspond to the one or more components of the second version of the security software product;
installing the one or more components of the second version of the security software product that do not affect execution of the first version of the security software product;
determining one or more components of the second version of the security software product that would affect execution of the first version of the security software product; and
refraining from installing the one or more components of the second version of the security software product that would affect execution of the first version of the security software product;
swapping the first and second versions of the security software product by activating the second version of the security software product and deactivating the first version of the security software product.

2. The method of claim 1, wherein:
the first version of the security software product comprises a first version of an antivirus application;
the second version of the security software product comprises a second version of the antivirus application.

3. The method of claim 1, further comprising:
rebooting a computing system on which the first and second versions of the security software product are installed, wherein the rebooting is performed after partially installing the second version of the security software product and before activating the second version of the security software product.

4. The method of claim 3, further comprising disabling a network adapter of the computing system until the second version of the security software product is activated;
wherein the second version of the security software product is activated during the rebooting process before the network adapter of the computing system is enabled.

5. The method of claim 1, wherein performing the partial install of the second version of the security software product over the first version of the security software product comprises:
installing one or more files of the second version of the security software product;
installing one or more components of the second version of the security software product needed during a boot process.

6. The method of claim 1, wherein deactivating the first version of the security software product comprises:
modifying a state of one or more components of the first version of the security software product such that the one or more components of the first version of the security software product will not restart after a reboot of a computing system to which the first version of the security software product is installed.

7. The method of claim 1, wherein:
performing a partial install of the second version of the security software product over the first version of the security software product comprises saving one or more settings of the first version of the security software product;

swapping the first and second versions of the security software product comprises importing the one or more settings of the first version of the security software product into the second version of the security software product.

8. The method of claim 1, wherein:

performing a partial install of the second version of the security software product over the first version of the security software product comprises identifying a set of differences between the first version of the security software product and the second version of the security software product;

swapping the first and second versions of the security software product comprises using the set of differences to update one or more components of the first version of the security software product for use with the second version of the security software product.

9. The method of claim 8, wherein using the set of differences to update the one or more components of the first version of the security software product for use with the second version of the security software product comprises updating one or more registry keys of the second version of the security software product by adding new registry keys, deleting old registry keys, and/or modifying existing registry keys.

10. The method of claim 1, wherein swapping the first and second versions of the security software product comprises:

uninstalling the first version of the security software product after the first version of the security software product is deactivated and the second version of the security software product is activated.

11. The method of claim 1, tangibly embodied as computer-executable instructions on at least one non-transitory computer-readable-storage medium.

12. The method of claim 1, wherein the second version of the security software product is partially installed over the first version of the security software product in an over-installation process such that there is no down time between deactivating the first version of the security software product and activating the second version of the security software product.

13. A computer-implemented method for updating a security software product, at least a portion of the method being performed by a computing device comprising at least one processor, the method comprising:

receiving a request to install a second version of the security software product over a first version of the security software product;

performing a partial install of the second version of the security software product in a dormant state over the first version of the security software product while the first version of the security software product is running by:

automatically identifying one or more components of the second version of the security software product that do not affect execution of the first version of the security software product by determining that the first version of the security software product is not utilizing components that correspond to the one or more components of the second version of the security software product;

installing the one or more components of the second version of the security software product that do not affect execution of the first version of the security software product;

determining one or more components of the second version of the security software product that would affect execution of the first version of the security software product; and refraining from installing the one or more components of the second version of the security software product that would affect execution of the first version of the security software product if installed;

rebooting a computing system on which the first and second versions of the security software product are installed;

swapping the first and second versions of the security software product by activating the second version of the security software product and deactivating the first version of the security software product.

14. The method of claim 13, wherein performing the partial install of the second version of the security software product comprises:

installing one or more files of the second version of the security software product;

installing one or more components of the second version of the security software product needed during a boot process.

15. The method of claim 13, wherein deactivating the first version of the security software product comprises:

modifying a state of one or more components of the first version of the security software product such that the one or more components will not restart after rebooting the computing system.

16. A system comprising:

at least one processor;

an interface module programmed to direct the processor to receive a request to install a second version of a security software product over a first version of the security software product;

an installation module programmed to direct the processor to perform a partial install of the second version of the security software product in a dormant state over the first version of the security software product while the first version of the security software product is running by:

automatically identifying one or more components of the second version of the security software product that do not affect execution of the first version of the security software product by determining that the first version of the security software product is not utilizing components that correspond to the one or more components of the second version of the security software product;

installing the one or more components of the second version of the security software product that do not affect execution of the first version of the security software product;

determining one or more components of the second version of the security software product that would affect execution of the first version of the security software product; and refraining from installing the one or more components of the second version of the security software product that would affect execution of the first version of the security software product;

a swapping module programmed to direct the processor to swap the first and second versions of the security software product by activating the second version of the security software product and deactivating the first version of the security software product.

17. The system of claim 16, wherein:
- the first version of the security software product comprises a first version of an antivirus application;
- the second version of the security software product comprises a second version of the antivirus application.

18. The system of claim 16, wherein the swapping module is programmed to direct the processor to deactivate the first version of the security software product by modifying a state of one or more components of the first version of the security software product such that the one or more components will not restart after a reboot of a computing system on which the first and second versions of the security software product are installed.

19. The system of claim 16, wherein the installation module is programmed to direct the processor to perform the partial install of the second version of the security software product by:
- installing one or more files of the second version of the security software product;
- installing one or more components of the second version of the security software product needed during a boot process.

\* \* \* \* \*